Oct. 23, 1934.                H. H. PAYZANT ET AL                1,977,971
                      LUMBER TRIMMING AND MARKING MACHINE
                       Filed March 17, 1932         14 Sheets-Sheet 1
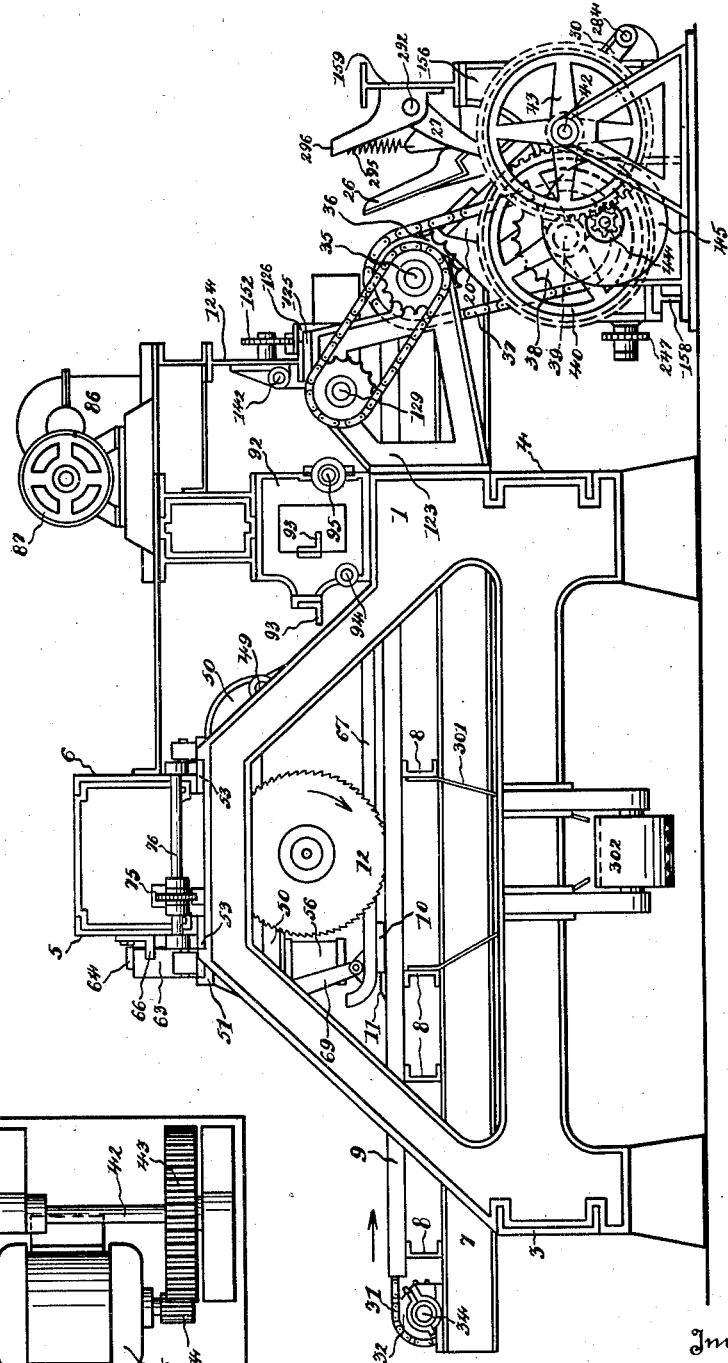
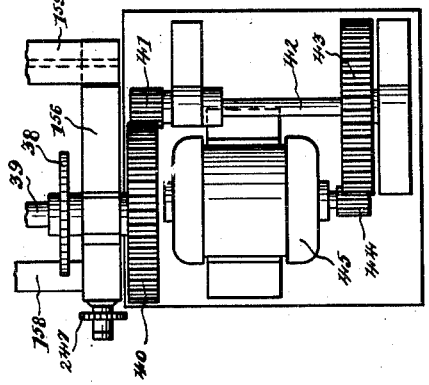
Inventors
Henry H. Payzant
Paul F. Lueth
By Stryker & Stryker
Attorneys

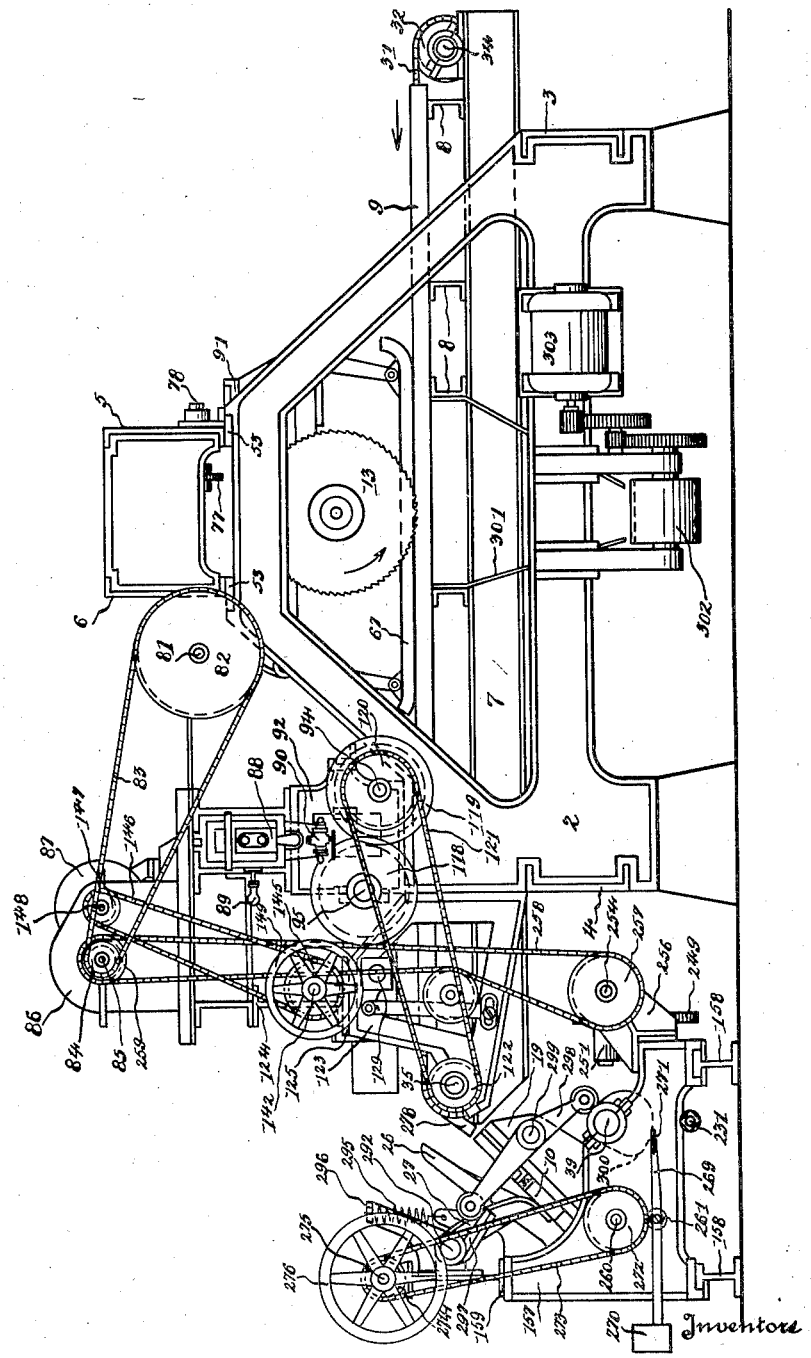

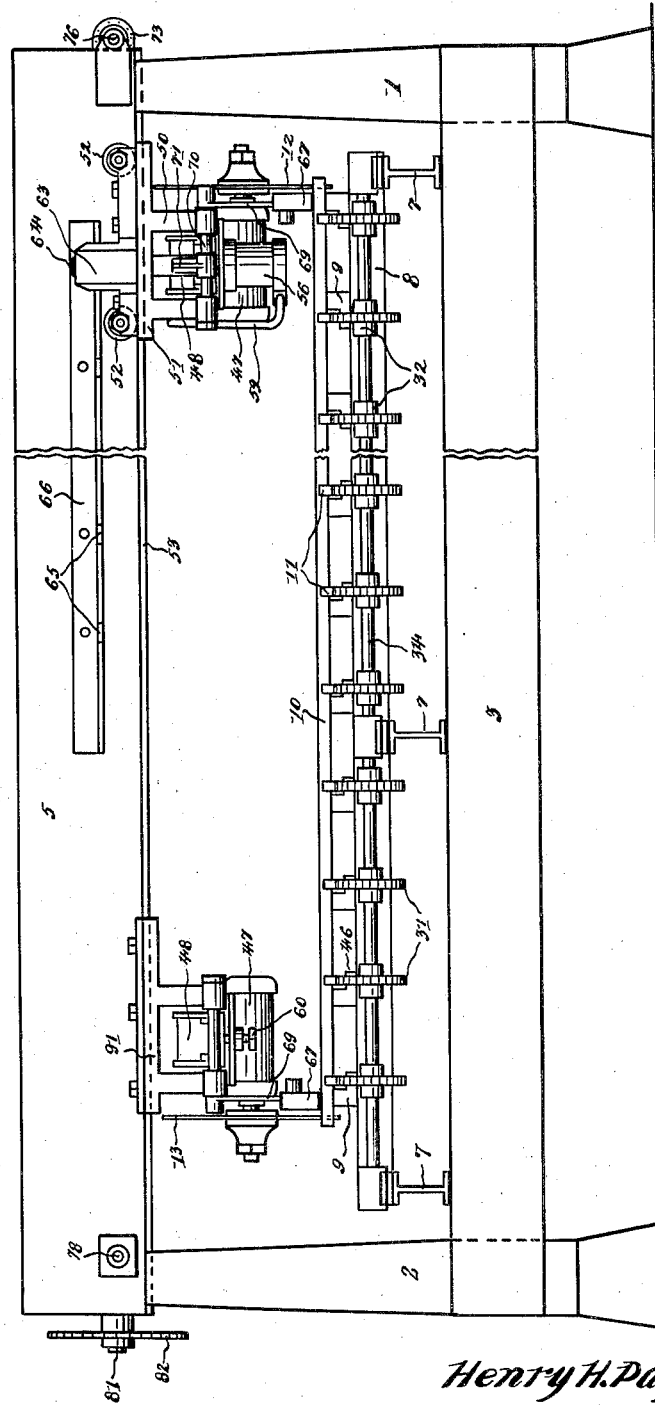

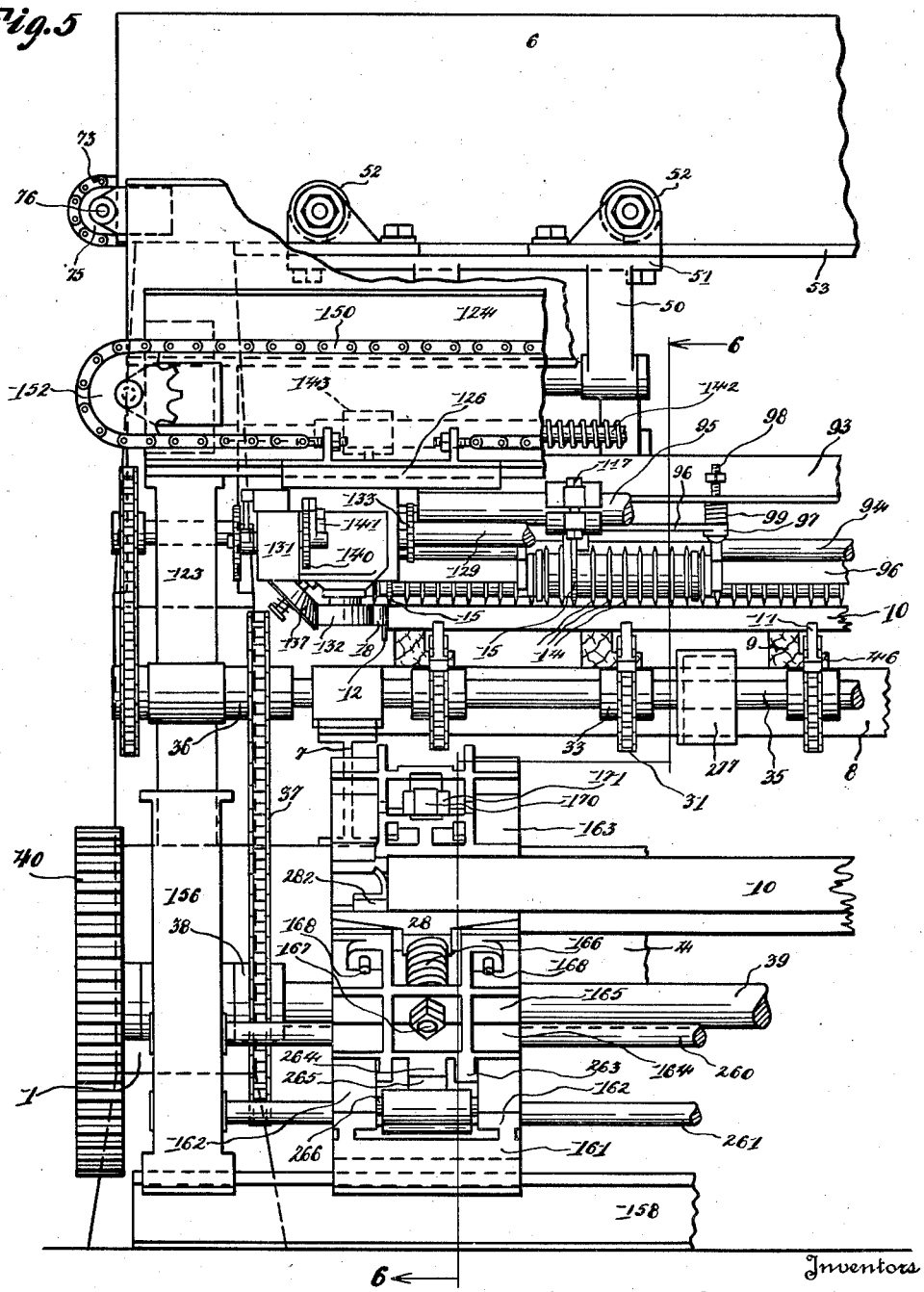

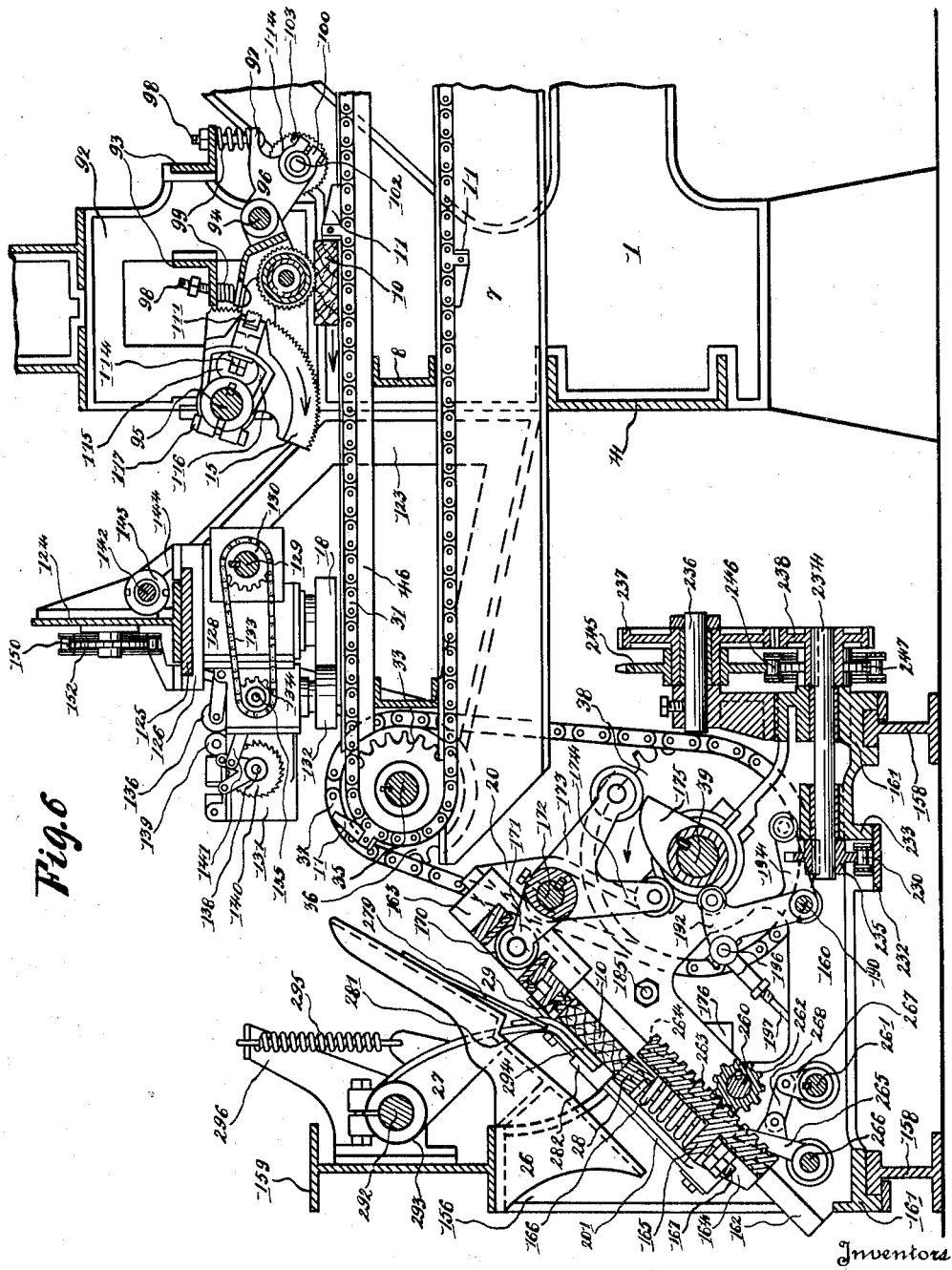

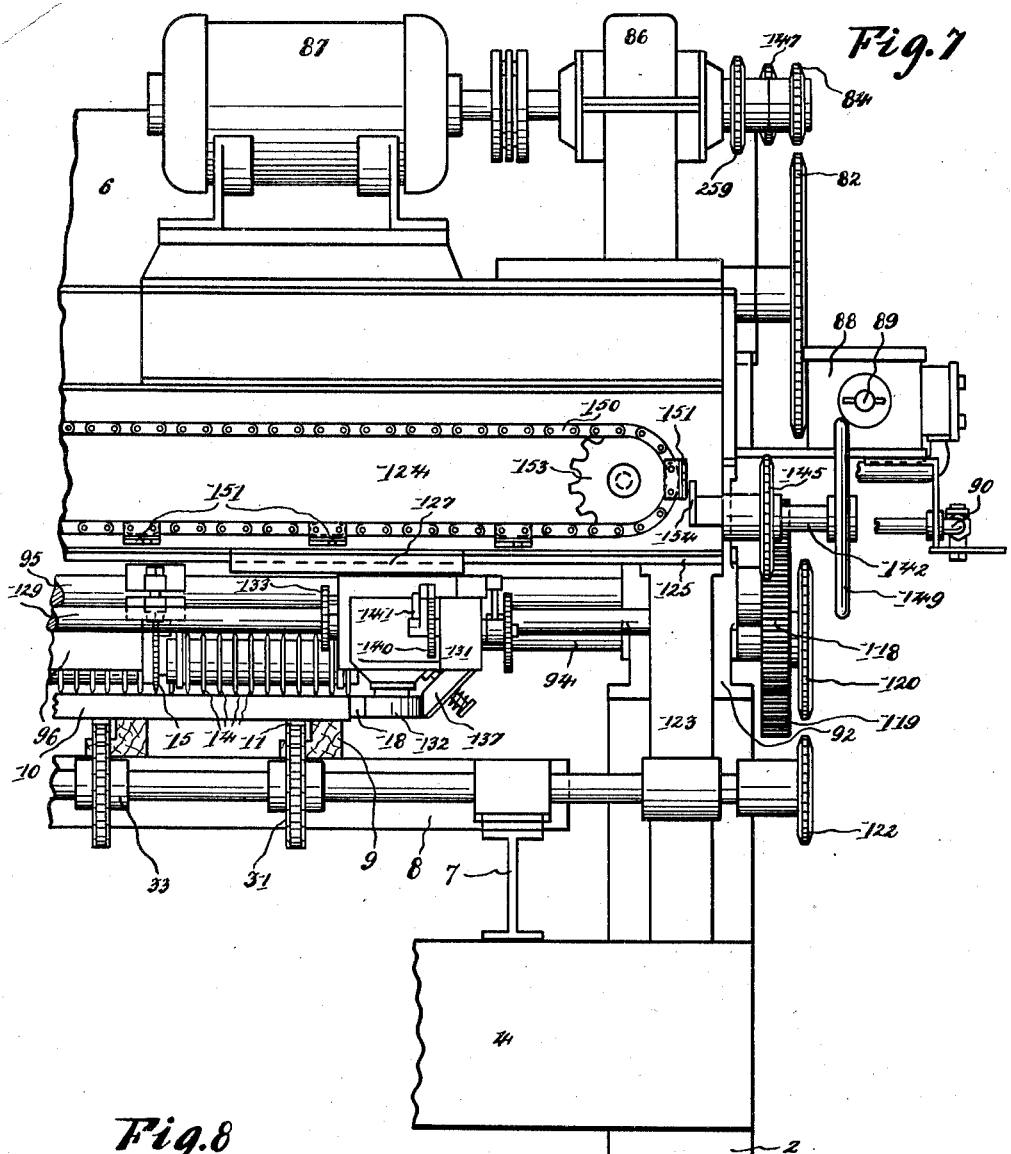

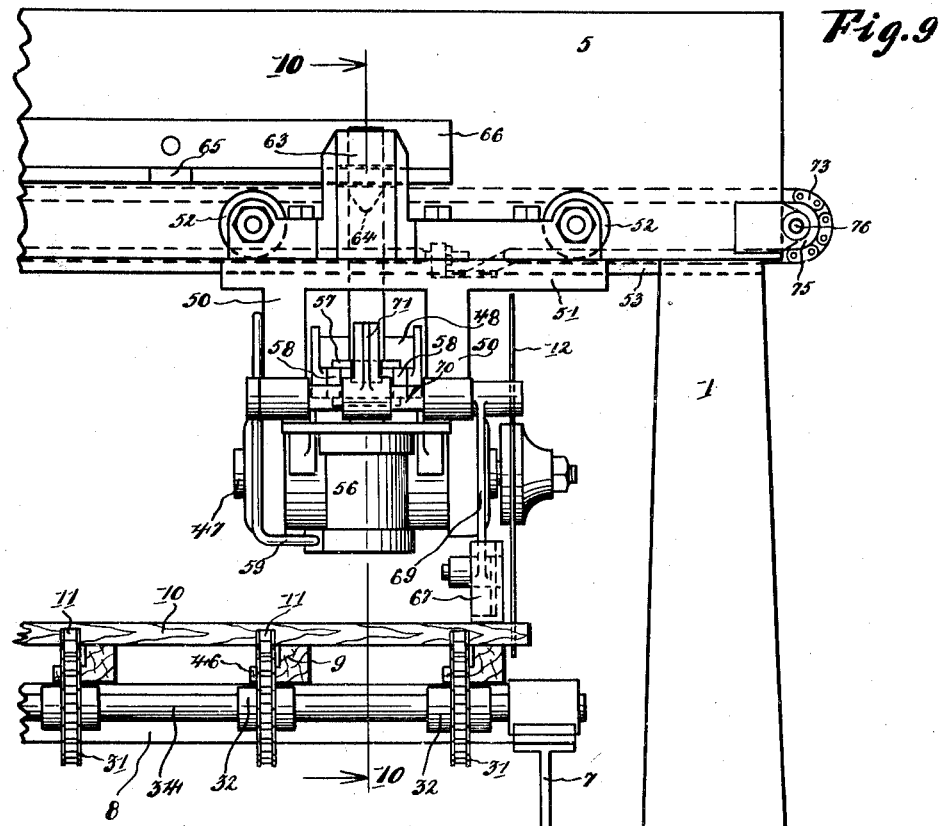
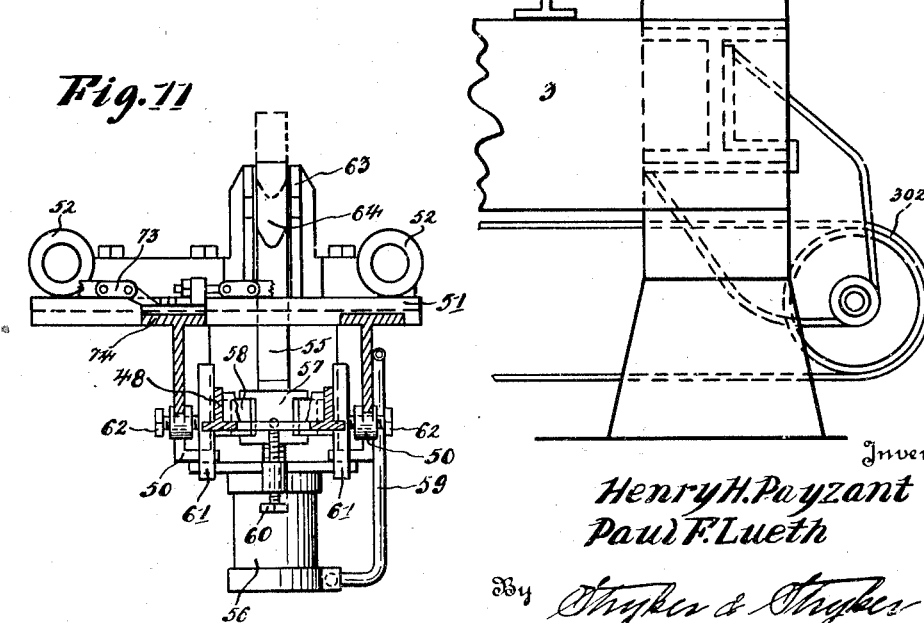

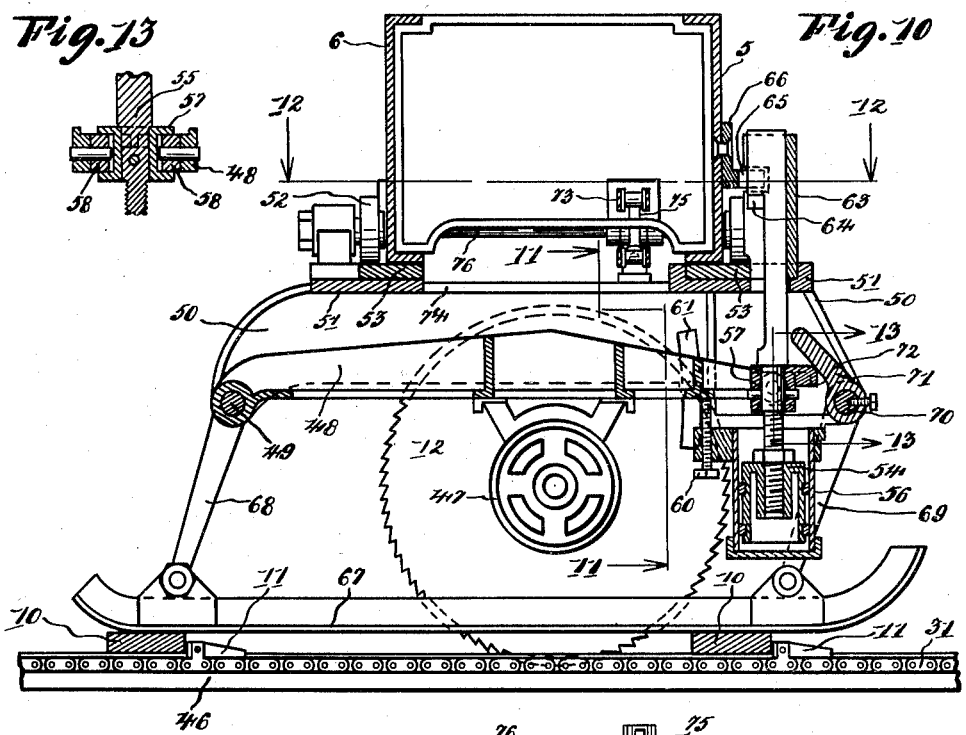
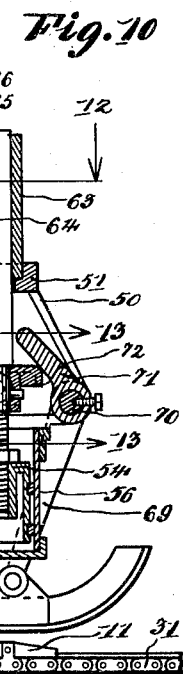
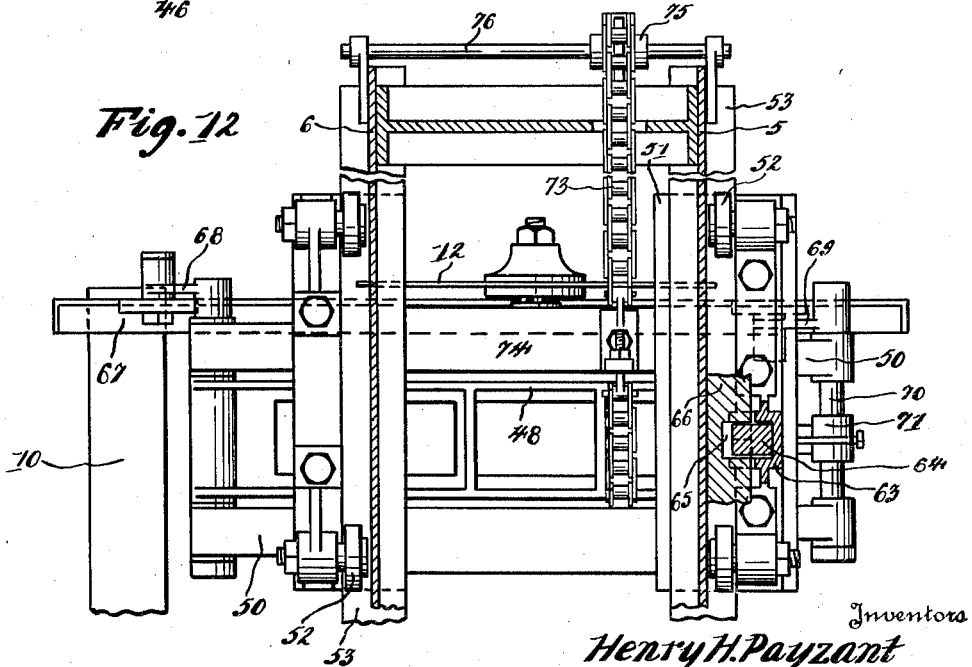

Oct. 23, 1934.   H. H. PAYZANT ET AL   1,977,971
LUMBER TRIMMING AND MARKING MACHINE
Filed March 17, 1932   14 Sheets-Sheet 9
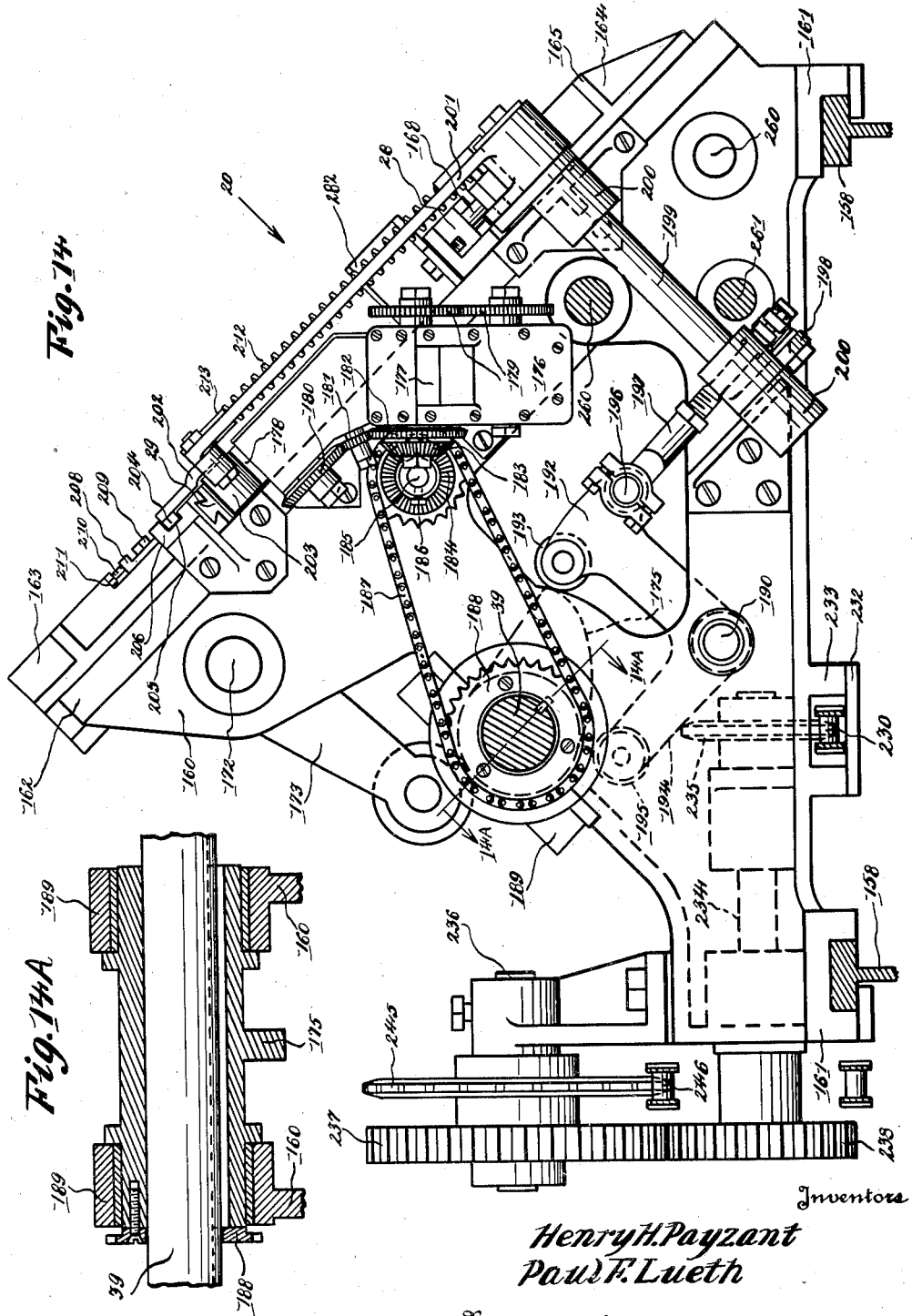
Inventors
Henry H. Payzant
Paul F. Lueth
By Stryker & Stryker
Attorneys Oct. 23, 1934.  H. H. PAYZANT ET AL  1,977,971
LUMBER TRIMMING AND MARKING MACHINE
Filed March 17, 1932   14 Sheets-Sheet 10
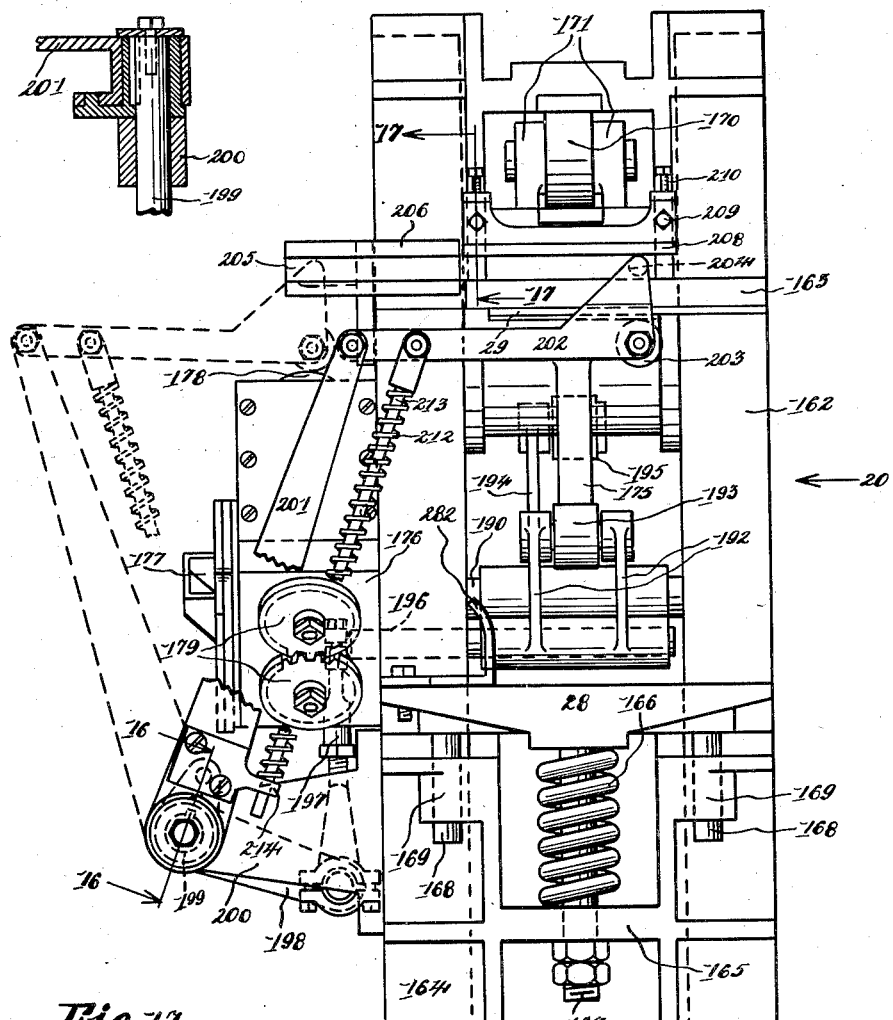

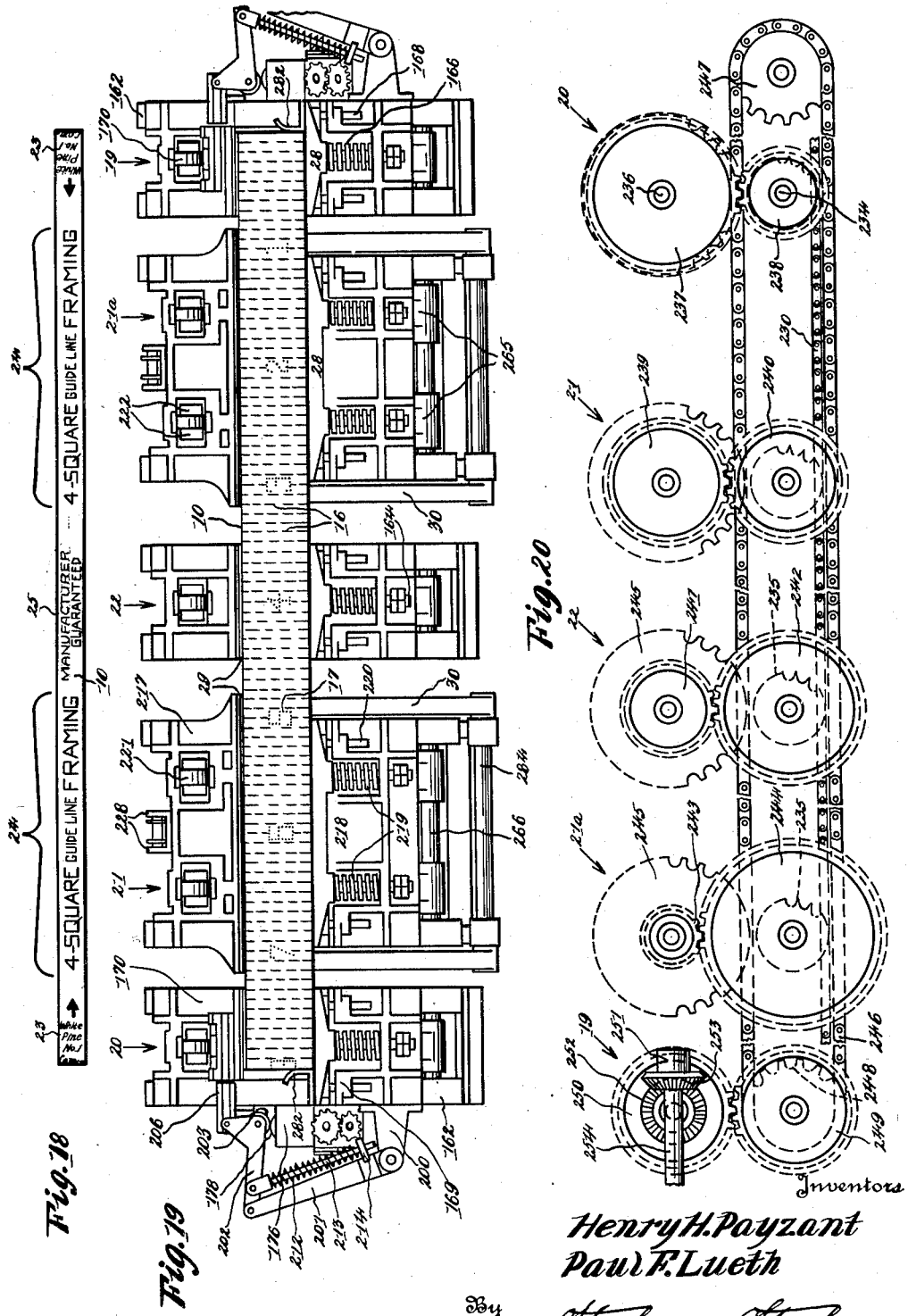

Oct. 23, 1934.  H. H. PAYZANT ET AL  1,977,971
LUMBER TRIMMING AND MARKING MACHINE
Filed March 17, 1932  14 Sheets-Sheet 12
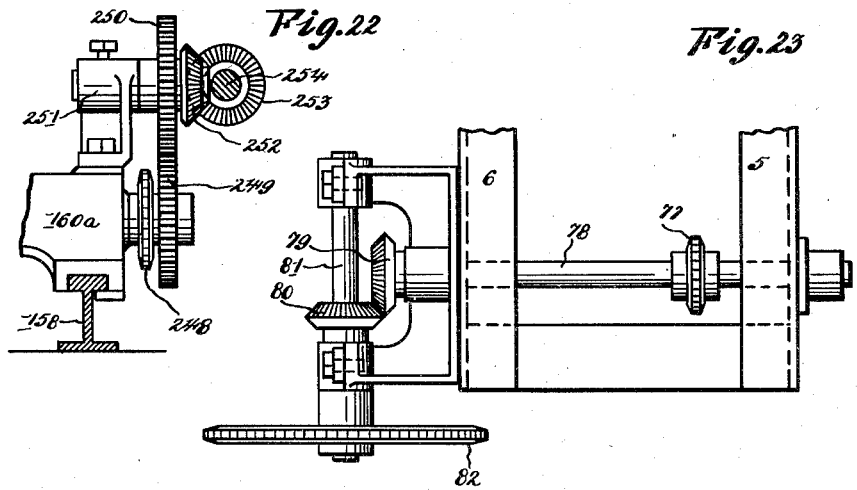
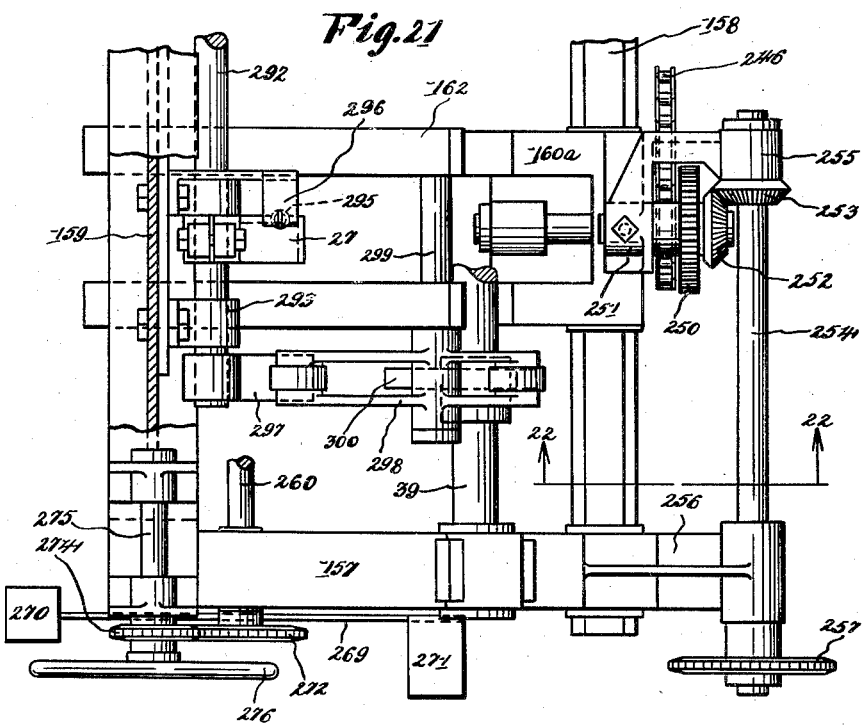
Inventors
Henry H. Payzant
Paul F. Lueth
By Stryker & Stryker
Attorneys

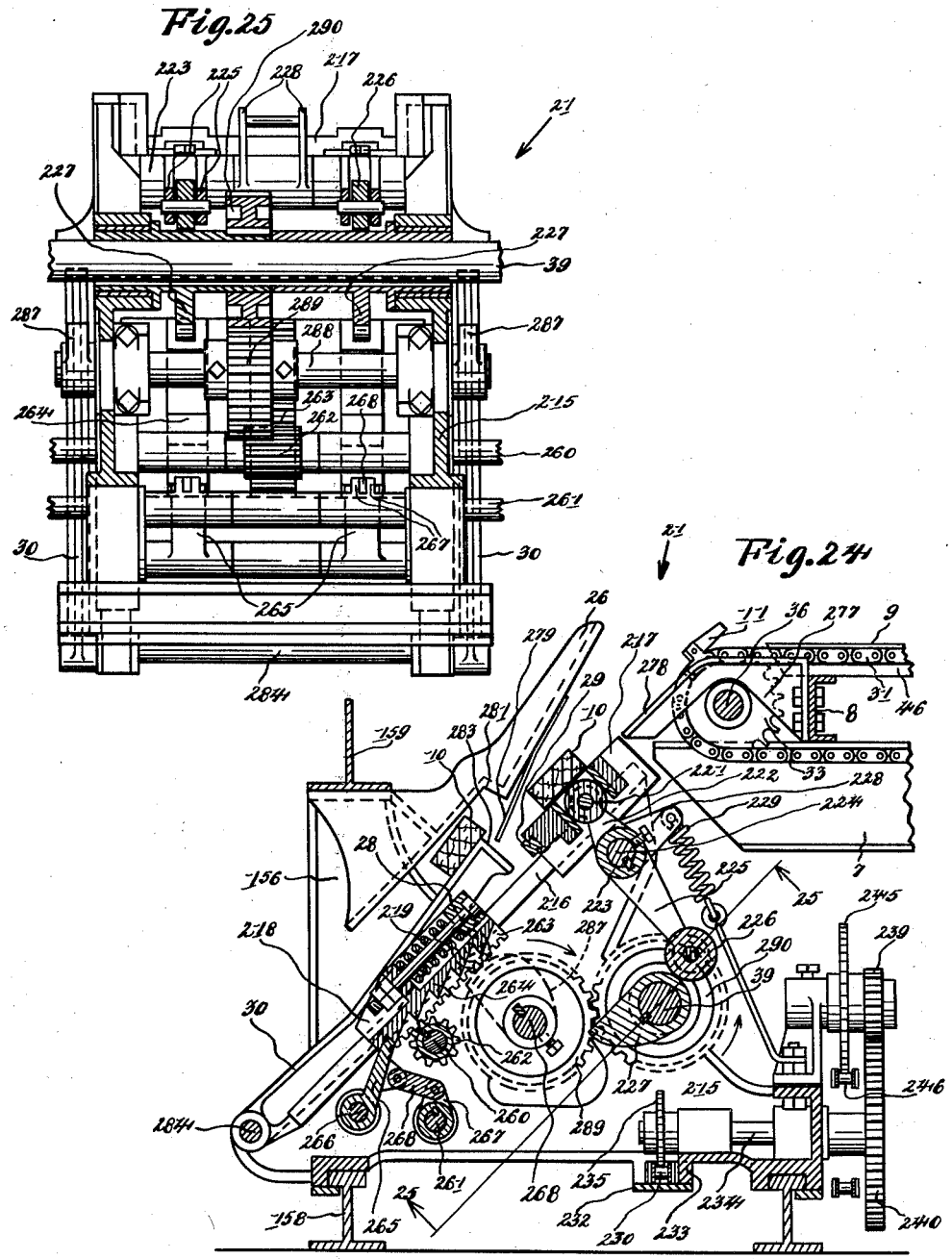

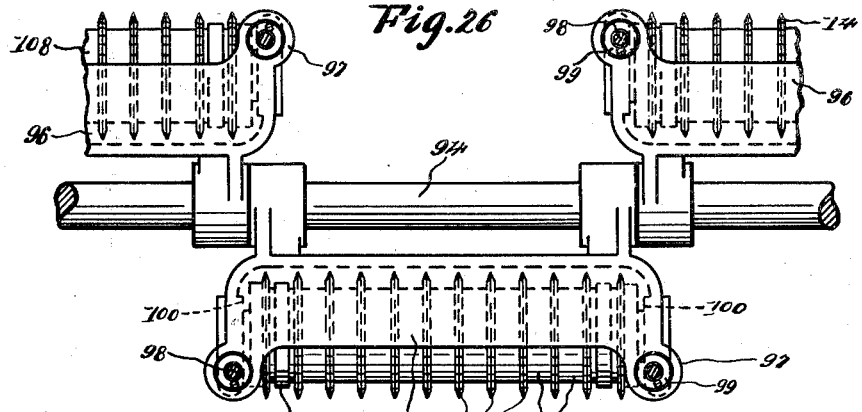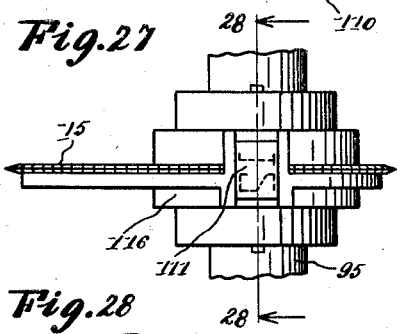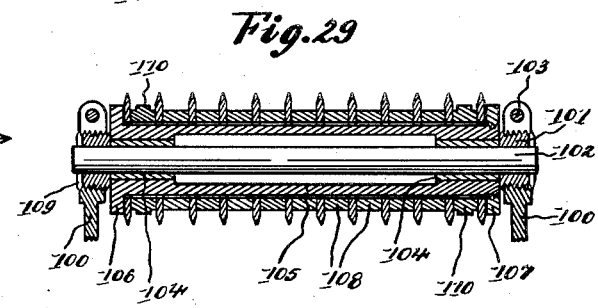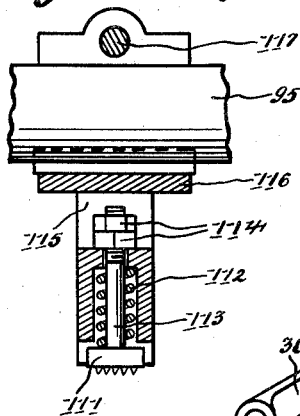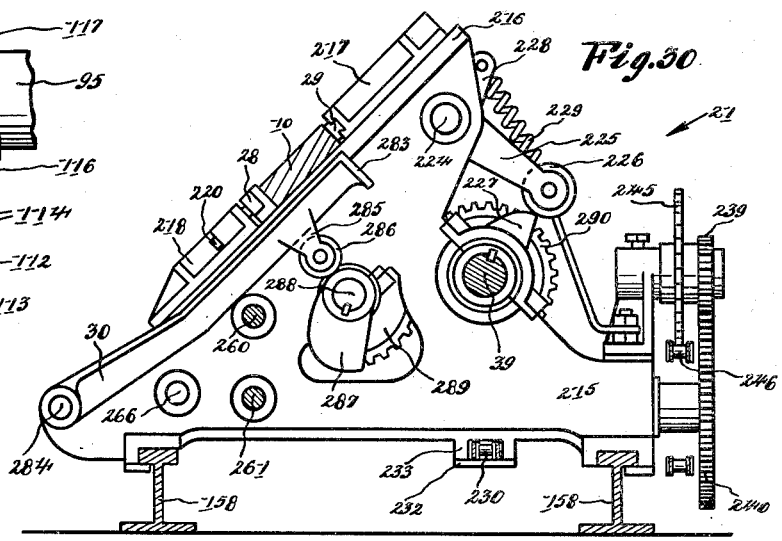

Patented Oct. 23, 1934

1,977,971

UNITED STATES PATENT OFFICE

1,977,971

LUMBER TRIMMING AND MARKING MACHINE

Henry H. Payzant and Paul F. Lueth, St. Paul, Minn., assignors to General Timber Service, Inc., St. Paul, Minn., a corporation of Delaware Application March 17, 1932, Serial No. 599,390

20 Claims. (Cl. 143—35)

It is an object of this invention to provide an efficient machine for increasing the value of lumber to the user by accurately subdividing each piece in such a manner that greater rapidity and higher quality of construction work is facilitated.

A further object is to provide in a machine, which is quickly and easily adjustable to accommodate boards and framing lumber of different lengths, efficient means for printing or impressing on the edges of each piece trade and grade marks, or other legends or marks, in proper registry and at regularly spaced intervals or otherwise arranged according to design.

Another object is to combine in one machine efficient means for trimming the ends of lumber accurately to size, for impressing, in distinct but inconspicuous manner, a numerical scale and foot and inch subdivisions and for printing, in attractive form, suitable legends or marks on the edges of each piece.

A still further object is to provide a novel arrangement of clamping jaws and associated dies for printing or impressing a plurality of marks or legends, spaced apart longitudinally of the lumber, in combination with means for feeding the lumber rapidly and under control between said jaws and for ejecting the lumber from said jaws.

The invention also includes certain other novel features of construction which will be more fully pointed out in the following specification and claims.

By our improved machine a suitable scale and identifying and grade marks are placed on each piece of lumber at such intervals and in such manner that the user of the lumber may be assured that he is securing lumber of the origin, kind and quality paid for, the identifying marks being so located and impressed that their removal is guarded against.

Further, in the usual construction work with lumber, much time is expended by the workmen in manipulating successively a number of tools such as squares, markers and rules. More rapid work can be accomplished with our improved lumber which has previously been accurately subdivided so that the carpenter can readily saw each piece to the desired length quickly and accurately and seldom needs to use a scale, square or marking implement.

Where the face of the lumber is to be exposed, as in the case of finishing lumber, the subdivisions or scale marks are placed upon the back or rough surface where they may be utilized in the construction work but are concealed in the finished structure. The trade and grade marks are placed on the edges and ends where such marks need not be displayed in the finished structure.

Referring to the accompanying drawings:

Figure 1 is an end elevation of the machine;

Fig. 2 is a fragmentary plan view showing one of the drive motors and the speed reducing gears adjacent thereto;

Fig. 3 is an end elevation showing the end opposite that shown in Fig. 1;

Fig. 4 is a rear side view showing the main frame, lumber conveyer and trimming saws and motors;

Fig. 5 is a fragmentary elevation showing a number of details of the mechanism located near the left of the machine as viewed from the delivery side thereof;

Fig. 6 is a section taken on the line 6—6 of Fig. 5, and also showing the lumber guides for the edge marking units, not shown in Fig. 5;

Fig. 7 is an elevation showing details of the frame, controls and drive for mechanism for traversing certain of the units longitudinally of the lumber, together with parts of the adjacent mechanism;

Fig. 8 is a detail end view of the traverse indicator;

Fig. 9 is an enlarged rear elevation of the movable saw, saw carriage and adjacent mechanism;

Fig. 10 is a section taken on the line 10—10 of Fig. 9;

Fig. 11 is a section taken on the line 11—11 of Fig. 10;

Fig. 12 is a horizontal section taken on the line 12—12 of Fig. 10;

Fig. 13 is a fragmentary vertical section taken on the line 13—13 of Fig. 10;

Fig. 14 is a side elevation of one of the edge printing units with the supporting rails, drive shafts and chain shown in transverse section;

Fig. 14a is a fragmentary section taken on the line 14a—14a of Fig. 14;

Fig. 15 is a face view (in the direction of the arrow in Fig. 14) of one of the edge printing units with portions broken away to show parts otherwise concealed;

Fig. 16 is a fragmentary section taken on the line 16—16 of Fig. 15;

Fig. 17 is a fragmentary section taken on the line 17—17 of Fig. 15;

Fig. 18 is a side elevation of a piece of lumber showing a suitable arrangement of legends or edge marking thereon;

Fig. 19 is a plan of the oblique faces of the several edge printing and marking units, showing their relations to a piece of lumber between the marking jaws;

Fig. 20 is a diagrammatic view showing the differential drive for traversing the edge printing and marking units longitudinally of the lumber;

Fig. 21 is a detail plan view and partial section showing the actuating mechanism for adjusting the edge markers to receive boards of different widths and also showing certain adjacent mechanism, concealed in the other views;

Fig. 22 is a section taken on the line 22—22 of Fig. 21;

Fig. 23 is a plan view of the driving mechanism for the saw traverse chain;

Fig. 24 is a typical transverse section through one of the longer edge marking units;

Fig. 25 is a section taken on the line 25—25 of Fig. 24;

Fig. 26 is a plan view of one of the gangs or groups of inch markers, together with portions of the adjacent groups and with the holddown springs and rods in horizontal section;

Fig. 27 is a plan view of one of the foot markers;

Fig. 28 is a section taken on the line 28—28 of Fig. 27;

Fig. 29 is a typical longitudinal section through one of the groups of inch markers; and Fig. 30 is a side elevation of one of the longer edge marking units with the supporting and actuating members shown in section.

As shown in Figs. 1, 3, 4, 5, 6 and 9, the main frame of the machine has similar end frames 1 and 2, generally A-shaped, connected by large channel beams 3 and 4 near the bottom and by similar beams 5 and 6 at the top. Extending transversely of the beams 3 and 4 is a series of I-beams 7. Secured to the top surface of the beams 7 are channel bars 8 arranged to support horizontally extending, parallel skids 9 for the pieces of lumber 10. Suitable lugs 11 are secured to a series of chains for conveying each piece of lumber 10 edgewise along the skids 9.

*Sequence of operation*

From the rear or receiving side of the machine the lumber is fed onto the table formed by the skids 9 and each piece passes first between rotary saws 12 and 13 which trim the ends. The lumber is next carried beneath groups of inch markers 14 (Fig. 5) and then to foot marking devices 15 which apply lines, a foot apart, and also the numerical scale to the top surface of each piece. Passing on from these foot and inch markers, the ends of each piece of lumber 10 are subjected to printing heads 18 which apply a trade-mark and/or grade marks to the end surfaces previously smoothed by the saws 12 and 13.

The next operation is to deliver the piece of lumber 10 to the edge marking units, best shown in Figs. 6 and 19, which simultaneously apply a series of legends or marks to the edges. This marking may be arranged as indicated on the edge of the piece of lumber shown in Fig. 18. To apply such marking we provide edge printing units, indicated generally by the numerals 19 and 20, a pair of longer marking units 21 and 21a and a small central unit 22. The units 19 and 20 apply the marking 23 (Fig. 18), the units 21 apply the legends such as those indicated by the numeral 24 and the unit 22 applies the central marking 25.

The several edge marking units are disposed with their upper faces extending obliquely downward from the ends of the lumber conveyer so that the lumber is allowed to slide down said faces under the guidance of series of arms 26 and 27 to a recess between spring pressed jaws 28 and the several dies 29 for applying the marks and legends 23, 24 and 25. By mechanism hereinafter described, the dies 29 are actuated against the edge of each piece of lumber and then the die with its supporting cross head is raised and pairs of arms 30 (Figs. 19 and 24) are actuated to remove the piece from between the jaws 28 and dies 29. The lumber finally slides down the inclined arms 30 to a suitable receptacle or conveyer at the delivery end of the machine. Details of the mechanism above outlined will now be described.

*Lumber conveyer*

The lugs 11 are mounted on a series of chains 31. These chains are trained on sprocket wheels 32 at the receiving side of the machine and on similar sprocket wheels 33 near the delivery side thereof (Figs. 1, 3, 4, 5 and 6). A shaft 34 supports the sprocket wheels 32 and has suitable bearings mounted on the rear ends of the I-beams 7. To drive the chains the sprocket wheels 33 are keyed to a shaft 35 and, as best shown in Figs. 1 and 5, the latter shaft has a sprocket wheel 36 arranged to be driven by a chain 37 extending down to a sprocket wheel 38 fixed on another shaft 39. A large spur gear 40 is fixed on an end of the shaft 39 which projects at the outer face of the machine frame and, as indicated in Fig. 2, the gear 40 is arranged to be driven by a pinion 41 secured to a shaft 42. The shaft 42 is driven through suitable speed reducing gears 43 and 44 from an electric motor 45.

As shown in Figs. 5 and 6, the upper reaches of the chains 31 are supported on laterally projecting flanges 46 formed on the skids 9. The lumber 10 is moved at right angles to its greatest dimension, the lugs 11 being located on the several chains in a line extending perpendicular to the saws 12 and 13.

*Saw mounting and traverse mechanism*

This mechanism is best shown in Figs. 1, 3, 4, 9 to 13 inclusive and 23. The saws 12 and 13 are of the direct-driven type, each having an electric motor 47. The saw 13 has a fixed position near one end of the machine while the saw 12 is movable longitudinally of the lumber to a number of predetermined positions so that the lumber may be trimmed to any standard or desired length. As shown in detail in Figs. 9 to 13 inclusive, the saw 12 with its motor is suspended from the bottom of a cradle 48 which is pivoted at one end on a shaft 49 extending between a pair of hangers 50. These hangers depend from a carriage 51 having wheels 52 adapted to roll on bars 53 secured to the frame members 5.

The cradle 48 is arranged to be raised at its rear end when the saw 12 is to be traversed longitudinally of the frame. To actuate the cradle 48 a piston 54 (Fig. 10) is connected thereto by a rod 55. A pneumatic cylinder 56 containing the piston 54 is secured to the hangers 50. Details of the connection between the rod 55 and cradle 48 are best shown in Figs. 11 and 13. Thus the rod 55 is fitted with a sleeve 57 having annular flanges which are engaged by small rollers 58 mounted on the cradle 48 at diametrically opposite sides of the rod 55. Compressed air or other fluid for operating the piston 54 is supplied to the lower end of the cylinder 56 through a small pipe 59. Downward movement of the cradle 48 is limited by a suitable stop screw 60 which is threaded in a lug formed on the hanger 50. To guide the cradle 48 in its pivotal movement, machined guide plates 61 are secured to the opposite outer surfaces of said cradle to engage the inner ends of guide screws 62 threaded in the hangers 50, as shown in Fig. 11.

The rod 55 projects above the sleeve 57 and is slidable in a rigid guide 63 projecting upward from the carriage 51. A wedge-shaped locking bolt 64 is rigidly secured to the upper end of the rod 55 and, being offset toward the frame member 5, is arranged to engage in openings 65 formed in a rail 66. This rail is fixed on the rear face of the beam 5 to coact with the bolt 64 in securing the traversable saw in positions corresponding to the openings 65 in said rail.

To hold the pieces of lumber flat and in proper engagement with the lugs 11 during the sawing operation, we provide, adjacent to each saw, a shoe 67 which is suspended from arms 68 and 69. The arms 68 and 69 have pivotal connections with the shoes 67. The arm 68 associated with the saw 12 is swiveled at its upper end on the shaft 49. The arm 69 is keyed at its upper end to a shaft 70 having bearings formed in the hangers 50. A crank 71 on the shaft 70 projects in the path of a finger 72 integral with the collar 57. By this arrangement, when the piston 54 is raised to raise the saw, the crank 71 is actuated by the finger 72 to swing the arms 68 and 69 in an arc and thereby raise the shoe 67 above the lugs 11 on the chains 31.

The mounting of the stationary saw 13 is similar to that above described with reference to the saw 12, except that the carriage 91 (Fig. 4) for supporting the saw 13 is bolted to the plates 53, instead of being movable therealong, and the mechanism for raising the cradle 48 and shoe 67 associated with the saw 13 is omitted from the carriage 91.

Traversing movement of the saw 12 and its associated mechanism is imparted to the carriage 51 by a chain 73. As best shown in Figs. 11 and 12, both ends of the chain 73 are secured to a transverse member 74 of the carriage 51. The chain 73 is trained over an idler sprocket wheel 75 mounted on a shaft 76 having bearings secured to the ends of the beams 5. From the wheel 75 both reaches of the chain 73 extend longitudinally of the machine between the beams 5 to the opposite end where, as shown in Figs. 3, 4 and 23, a sprocket wheel 77 is mounted on a shaft 78 for driving the said chain. Suitable bearings are mounted on the beams 5 and 6 for the shaft 78 and a projecting end of said shaft has fixed thereon a beveled pinion 79 arranged to be driven by a similar pinion 80 secured to a shaft 81. The shaft 81 is arranged to be driven by a sprocket 82 having trained thereon a chain 83. This chain is, in turn, driven by a sprocket wheel 84 (Figs. 3 and 7). The sprocket wheel 84 is fixed on a shaft 85 adapted to be driven, through suitable speed reducing gears in a casing 86, by an electric motor 87.

The motor 87 is of the reversible type and is under control of a switch 88 having a hand lever 89 adapted to be manipulated to start the motor 87 forward or in reverse and also to stop it. A valve 90 for controlling the supply of compressed air or other fluid to the cylinder 56 through the pipe 59 is preferably located adjacent to the switch 88 so that the entire operation of traversing the saw is controlled from the station of an operator at the end of the machine.

Saw traverse operation

The machine is designed to trim boards to any of the standard lengths of say from eight to twenty feet and to position the saw 12 in any desired operative position. To change the position of the saw 12, the valve 90 is first operated to admit compressed air or other fluid to the cylinder 56 through the pipe 59. This raises the rod 55 and connected end of the saw cradle 48 and causes the crank 71 to be actuated by the finger 72 in such direction as to raise the shoe 67. As the rod 55 is thrust upward the lock bolt 64 is withdrawn from one of the openings 65 in the rail 66 to thereby free the carriage 51 for movement longitudinally of the bars 53. While the saw and shoe 62 are retained in this elevated position, the lever 89 is manipulated to start the motor 87 in the appropriate direction. This operates the chain 73 connected to the carriage 51 and said carriage longitudinally of the frame. When the saw has thus been traversed to the desired position the motor 87 is stopped and the saw is lowered to operative position by releasing the fluid from the cylinder 56. The saw can only be lowered to operative position when the bolt 64 is in registry with one of the openings 65. This guards against interference between the saw and lumber conveyer or skids during traversing movement and insures the exact location of the saw in certain operative positions to the end that the lumber is accurately trimmed to the desired or proper lengths.

Foot and inch marking devices

An auxiliary frame for this mechanism consists of a pair of end standards 92 supported on the end frames 1 and 2 and rigidly connected together by a pair of angle bars 93 extending longitudinally of the machine (Figs. 1, 3 and 6). Shafts 94 and 95 are supported at their ends in suitable bearings in the standards 92, the shaft 94 constituting a pivot for a series of hangers 96, each carrying a group of the inch markers 14 and the shaft 95 having keyed thereon, at one foot intervals, the foot markers 15. Each of the hangers 96 has a pair of ears 97 projecting therefrom and these ears are perforated to receive suspension bolts 98 connected to one of the bars 93. Spiral springs 99 are severally confined on the bolts 98 to resiliently thrust the hangers 96 downward. Thus the hangers 96 are arranged to be raised against the action of the springs 99 as the markers 14 are raised by each piece of lumber.

Details of the groups of markers 14 are shown in Figs. 26 and 29. As here illustrated, each hanger 96 has a pair of arms 100 which are bifurcated and threaded to receive adjustable heads 101. These heads 101 are split to permit them to be clamped on an axial shaft 102. Clamping force is exerted by bolts 103 connecting the branches of arms 100. Fitting on the shaft 102 is a pair of bronze bushings 104 and journaled on said bushings is a long sleeve 105 having an annular flange 106 at one end and a nut 107 threaded on the other end. The inch markers 14 are thin disks having toothed peripheries to engage the lumber. Each disk has a central opening to fit the sleeve 105 and the several disks are spaced apart by collars 108 which also fit on the sleeve 105.

As clearly indicated in Figs. 6 and 26, the hangers 96 are arranged to project alternately at opposite sides of the shaft 94 so that ample bearings for each group are afforded without leaving gaps in the marks which are placed at regular intervals of one inch from end to end of each piece of lumber. Proper spacing of the marking disks at the ends of one group from those at the ends of the adjacent groups is secured by turning the screw threaded heads 101 in the appropriate direction, each of said nuts having a kerf 109 to engage a spanner wrench. It will be understood that the several inch markers 14 of each group rotate as a unit on the bushings 104 and the toothed peripheries of the markers 14 penetrate the surface of the lumber. In order to limit this penetration, irrespective of the hardness or softness of the wood, we provide each group of inch markers with a pair of rollers 110 of somewhat larger diameter than the spacers 108, to engage the surface of the lumber.

Each foot marker 15 has a toothed periphery to impress a line across the lumber which is distinguishable from the inch marks and also a die 111 for applying the numerical designations of foot marks, such as those indicated at 17 in Fig. 19. As shown in Figs. 27 and 28, the face of the die 111 has a series of projections to form the numeral and said die is resiliently pressed radially outward by a spring 112. This spring is coiled around a stud bolt 113 projecting from the back of the die 111 and outward movement of the die is limited by suitable lock nuts 114 threaded on said stud in a recess 115 formed in a holder 116 to which the peripheral portion of the foot marker is secured. The holder 116 is keyed to the shaft 95 and is split to receive a bolt 117 for clamping the marker in accurately adjusted position on the shaft.

One of the shaft 95 projects from one of the standards 92 and has fixed on the projecting end a spur gear 118, as shown in Figs. 3 and 7. A gear 119 for driving the gear 118 is freely revoluble on a projecting end of the shaft 94 and a sprocket wheel 120 is fixed on the face of the gear 119 to be driven by a sprocket chain 121. The latter chain is trained on a sprocket wheel 122 fixed on an end of the drive shaft 35 for the lumber conveyer. Thus the foot markers 15 are driven in timed relation to the conveyer chains 31 and the lugs 11 are so positioned on said chains that a piece of lumber is delivered beneath the foot marker in proper position to receive the impression of the die 111 in predetermined, spaced relation to the sides of the lumber. After receiving the foot and inch marks, each piece of lumber 10 is conveyed to the rotary dies 18 adapted to print on the end surfaces.

*End printing mechanism and traverse therefor*

As shown in Figs. 5, 6 and 7, similar printing devices, each having a printing head 18, are provided to make impressions on opposite ends of the lumber. The frame for supporting both of these devices consists of similar brackets 123 secured to the main frames 1 and 2 (Figs. 1 and 3) and a large I-beam 124 connecting said brackets and extending longitudinally of the machine. On the bottom of the beam 124 a plate 125 is bolted and projects at the sides to afford a support for a printing head carriage 126 at one end and a similar but stationary hanger 127 near the opposite end of the machine. A housing 128 is secured to the carriage 126 and projecting horizontally from bearings in this housing is a drive shaft 129. Opposite ends of the shaft 129 have bearings in the brackets 123 and said shaft has a longitudinal keyway to slidably receive a key for driving engagement with a small sprocket wheel 130 on the exterior of the housing 128. Suitable gearing within the housing 128 operatively connects the shaft 129 to the printing head 18.

Mechanism is also provided for transmitting ink from a container 131 to a distributing roll 132 in engagement with the periphery of the head 18. It is not sought in the present application to claim the particular mechanism shown in the drawings for inking the head 18. As illustrated, the ink distributing mechanism is driven by a chain 133 trained on the sprocket wheel 130 and arranged to drive a sprocket wheel 134 fixed on a shaft 135. The latter shaft has suitable gearing within the housing 128 for driving the distributing roll 132 and also carries a roller for transmitting ink from a horizontally disposed roller 136 (Fig. 6) to a conical roller 137 (Fig. 5) the latter roller having its periphery in contact with the roll 132. A horizontal shaft 138 carries a composition roller within the ink container 131 for raising the ink to a roller 139 in contact with the roller 136. Intermittent rotation of the shaft 138 is transmitted thereto by a suitable ratchet and pawl connection between a ratchet wheel 140 fixed on an end of the shaft 138 and a link 141 operable by an eccentric on the shaft 135.

Movement of the carriage 126 longitudinally of the beam 124 is imparted by a screw-threaded shaft 142 extending from end to end of the machine and engaging a threaded bearing 143 formed on a bracket 144 projecting from the carriage 126 (Figs. 5 and 6). At the control end of the machine, shown in Figs. 3 and 7, the shaft 142 has fixed thereon a sprocket wheel 145 adapted to be driven by a chain 146 extending to a sprocket wheel 147. The latter sprocket wheel is fixed on a motor driven shaft 148 projecting from the housing 86. The shaft 142 is further provided at its extremity with a hand wheel 149 for taking up slack in the chain 146 and for accurately positioning the longitudinally movable printing head relative to the lumber.

To indicate to an operator stationed at the control end of the machine the position of the traversable printing head relative to the lumber, we provide a chain 150 (Figs. 5, 6, 7 and 8) secured to the carriage 126 and carrying a series of spaced lugs 151 having severally marked thereon the lengths in feet to which the lumber is to be cut. On the front of the beam 124 are mounted sprocket wheels 152 and 153 upon which the chain 150 is trained. As shown in Fig. 5, the ends of the chain 150 are secured to the carriage 126 so that the chain is actuated in accordance with the movement of the printing head carriage. At the control end of the machine, a stationary index marker 154 (Figs. 7 and 8) is mounted to coact with the lugs 151 carrying the numerical designations 155 corresponding to the position of the printing head.

When the machine is to be readjusted to trim and mark lumber of a given length, the motor 87 is operated under control of the switch 88 so that the screw shaft 142 is driven in the appropriate direction through the connections, including the shaft 148, sprocket wheel 147, chain 146 and sprocket wheel 145. Rotation of the shaft 142 actuates the carriage 126 through the threaded bracket 143. The motor 87 is stopped when the numerical designation 155, corresponding to the desired length of the lumber, appears on the lug 151 approximately in registry with the index 154. Accurate adjustment is then secured by manipulating the hand wheel 149.

Edge printing mechanism

As shown in Figs. 1, 3, 5 and 6, the edge printing and marking mechanism is supported on a frame consisting of end standards 156 and 157 secured to a pair of parallel supporting rails 158 and connected at the top by an I-beam 159. Journaled in the end of the frames 156 and 157 is the main drive shaft 39.

The edge printing units 19 and 20 (Fig. 19) apply the marking indicated by the numeral 23 in Fig. 18. These units are similar except that the unit 19 is stationary and the unit 20 is movable longitudinally of the lumber to print on pieces of any length within the capacity of the machine. The other edge marking units 21, 21a and 22, more fully described hereinafter, are also movable longitudinally but no inking mechanism is provided for the dies of the said units, whereas, the impression of the units 19 and 20 is rendered more conspicuous by inking the dies 29 thereof.

Details of the units 19 and 20 are shown in Figs. 5, 6 and 14 to 17 inclusive. A carriage 160, for supporting the end printing unit 20, is formed with generally triangular end frames connected by transverse members 161 (Figs. 5 an 6). Each of the latter members has a machined way to slidably engage the rails 158. Extending at an angle of 45 degrees to the horizontal are parallel guideways 162 for the spring-pressed jaw 28 and a movable jaw or cross head 163 supporting the printing die 29. The jaw 28 is mounted on a frame 164 (Figs. 5, 6 and 19) formed with an upstanding flange 165 constituting an abutment for a spring 166 for urging the jaw 28 obliquely upward against the lumber 10. The spring 166 is confined on a stud bolt 167 rigidly connected to the jaw 28 and slidable in a perforation in the flange 165, suitable lock nuts being provided on the lower end of the bolt 167 to engage the flange 165 and limit upward movement of the jaw. To further guide the jaw 28 a pair of studs 168 are arranged to slidably fit in bearings 169 formed on the frame 164.

The cross-head 163 is formed with spaced, parallel members to engage opposite sides of a roller 170 mounted on a pair of crank arms 171 for actuating the die carried by said cross-head against the lumber. The crank arms 171 are fixed on a shaft 172 having end bearings in the carriage 160. Integral with the crank arms 171 are pairs of arms 173 and 174 arranged to be actuated by a cam 175 splined on the shaft 39, suitable anti-friction rollers being mounted on the ends of the arms 173 and 174 to engage said cam. By this arrangement the cam 175 is caused to positively close the die 29 on the lumber and then to positively retract or open the printing jaws to permit removal of the lumber.

Mechanism is provided for applying ink to the dies 29 of the units 19 and 20, said inking mechanism being best shown in Figs. 14 to 17 inclusive and 19. The ink is contained in a reservoir 176 having a filling opening 177, said reservoir being secured to the outer face of the carriage 160. By suitable composition rolls within the casing extending above the reservoir 176, the ink is distributed on the periphery of a roller 178 projecting from the top of the casing. To drive the composition rolls, a pair of spur gears 179 are mounted on one side of the reservoir 176 and beveled gears 180, 181 and 182 are mounted on the opposite side of the roll casing. The gear 182 is fixed on a shaft carrying a beveled gear 183 in mesh with a similar gear 184 secured to a shaft 185. A pinion 186 is also secured to the shaft 185 to be driven by a chain 187. This chain is trained on a sprocket wheel 188 (Figs. 14 and 14a) bolted to an end of an elongated hub formed on the cam 175 which projects from the outer side of a bearing 189 for the shaft 39.

The cam 175 is arranged to actuate mechanism for transmitting the ink from the roller 178 to the face of the die 29. As shown in Figs. 6, 14 and 15, a short shaft 190 is mounted horizontally on the carriage 160 and pivoted on the shaft 190 is a sleeve 191 having a pair of spaced, parallel arms 192 integral therewith. Mounted between the free ends of the arms 192 is a roller 193 to be actuated by the cam 175. Another arm 194 projects from the sleeve 191 and carries a roller 195 in engagement with the cam 175. Projecting horizontally from the arms 192 is a rigid shaft 196 which is connected by a link 197 to a crank 198 fast on a shaft 199. The link 197 has male and female threaded projections to permit adjustment of the effective length of said link. Bearings for the shaft 199 are supported in brackets 200 which project from the outer face of the carriage 160 and the upper end of said shaft has rigidly secured thereto a long arm 201. Pivotally connected to the upper end of the arm 201 is a horizontally extending member 202 carrying on its free end a composition roller 203 for transmitting the ink from the roller 178 to the die 29. The member 202 has a lug 204 projecting into a guide groove 205 formed in a bracket 206 secured to the carriage 160. A guide groove 207 (Figs. 15 and 17) is formed in the cross-head 163 to register with an end of the groove 205 when the cross-head is at the upper extremity of its stroke. Adjustment of the position of the roller 203 is facilitated by providing a movable bar 208 on the cross head 163 for engagement with the lug 204. Bolts 209 pass through elongated openings in the bar 208 to guide it and set screws 210 are threaded in the upper edge of said bar to engage a shoulder 211 formed in the cross head 163. By turning the screws 210 the bar 208 may be moved against the friction produced by the bolts 209.

To urge the free end of the member 202 obliquely upward, a spring 212 is confined on a rod 213 connected to the member 202 and the lower end of said spring abuts against a lug 214 which is perforated to slidably receive the lower end of the rod 213. The lug 214 is integral with a plate secured to the arm 201 a short distance above the shaft 199.

In operation, a piece of lumber is delivered between the jaws 28 and dies 29 for each revolution of the shaft 39 and the cam 175 actuates the arms 192 and 194 alternately to oscillate the arm 201 through the connections including the shaft 196, link 197, crank 198 and shaft 199. This movement is so timed that the guide groove 207 in the cross-head 163 is in registry with the end of the guide groove 205 as the arm 201 is thrust forward to carry the lug 204 into engagement with the adjustable bar 208. During the stroke of the arm 201 the roller 203 is carried forward across the die 209 and back again to transmit the supply of ink for an impression from the roller 178 to the face of the die 29. Before the cam 175 actuates the arm 173 to move the cross-head 163 downward the lug 204 has been withdrawn from the guide groove 207 by the action of the cam 175 in engaging the roller on the arm 194. Continued rotation of the cam 175 in the direction indicated by an arrow in Fig. 6 actuates the cross-head 163 to make the impression on the lumber 10 while the large spring 166 gives the desired resilient contact and relief of the pressure in case an obstruction tends to cause pressure in excess of a safe limit. After the impression has been made on the lumber the cam 175 engages the roller on the arm 173 to open the jaws.

The operation of the inking and printing mechanism for the unit 19 takes place simultaneously with the operation of the unit 20 and the construction of the unit 19 is similar to that above described in all respects.

*Edge marking units*

No inking mechanism is provided in connection with the edge marking units 21, 21a and 22. With this exception, the unit 22 is identical with the units 19 and 20 hereinbefore described. Details of the units 21 and 21a, in so far as they are different from the unit 20, are shown in Figs. 19, 24, 25 and 30. Each of the units 21 and 21a has a carriage 215 formed with machined ways at the bottom to engage the rails 158. Similar upright frames at the ends of each carriage 215 are formed with guideways 216 for a cross-head 127 and for a frame 218 supporting the jaw 28.

The frames 218 and jaws 28 for the units 21 and 21a are longer than the frames 164 and jaws 28 of the units 19, 20 and 22 but are otherwise similar thereto. Thus a pair of springs 219 are provided for each of the units 21 to afford a resilient support for the jaws 28, these springs being coiled on stud bolts similar to the bolts 167 and the jaw 28 has a pair of studs 220 for guiding it in the frame 218. The cross-head 217 is formed with openings to receive similar rollers 221 mounted on arms 222. The latter arms are integral with sleeves 223 fixed on a shaft 224 having bearings in the carriage 215. A second pair of arms 225 is formed integral with each of the sleeves 224 and an anti-friction wheel 226 is mounted between the arms of each pair to be actuated by a cam 227 similar to the cam 175. The cams 227 are integral with a long sleeve slidably keyed to the shaft 39. To actuate the cross-head 217 upward a pair of arms 228 are secured to the shaft 224 to be actuated by a spring 229 having connection with the frame of the carriage 215.

It will now be understood that as the cams 227 rotate, the cross-head 217 is given reciprocating movement from an open position, where the die 29 is free of the lumber, to a closed position where said die makes the impression. The impression made by the marking units 21, 21a and 22 is less conspicuous than that made by the inked dies of the units 19 and 20, but is rendered amply distinct for identification by the application of sufficient force to impress the legend or other marking into the wood.

*Traverse for edge printing and marking units*

Extending from the end frame 156 to the end frame 157 is a single strand of chain 230. This chain is secured to said end frames by bolts 231 (Fig. 3) and is supported and guided intermediate said end frames by plates 232 secured to downwardly projecting flanges 233 formed on the carriages 160 and 215 for the units 20, 21, 21a and 22. On each of said carriages is also mounted a horizontal shaft 234 having a sprocket wheel 235 for engaging the chain 230. As illustrated in Figs. 6, 14, 21, 24 and shown diagrammatically in Fig. 20, a short shaft 236 is mounted on each of said carriages above the shaft 234 in spaced parallel relation thereto. For the unit 20 a gear 237 (Figs. 6 and 20) is secured to the shaft 236 to drive a gear 238 on the shaft 234, the latter gear being keyed to said shaft for traversing the printing unit 20 longitudinally of the rails 158. Differential gearing for actuating the units 21, 21a and 22 is arranged to operatively connect the shafts 236 with the shafts 234 of the latter units. As shown in Fig. 20 this drive for the unit 21 consists of a pair of differential gears 239 and 240 mounted on the shafts 236 and 234 respectively. For the unit 22, gears 241 and 242 provide a different driving ratio while a still further difference for the unit 21a is secured by gears 243 and 244.

Fixed on the hubs of the gears 237, 239, 241 and 243 respectively are sprocket wheels 245 of equal diameters adapted to be driven by a chain 246. This chain is trained on a sprocket wheel 247 (Figs. 1 and 20), said sprocket wheel being mounted on a shaft projecting from the end frame 156. At the drive end, shown in Figs. 3, 21 and 22, the chain 246 is trained on a sprocket wheel 248, which is revoluble on a rigid shaft secured to the carriage 160a for the stationary printing unit 19. Rigidly fastened to the outer face of the sprocket wheel 248 is a coaxial spur gear 249 adapted to be driven by a gear 250 revoluble on a rigid shaft projecting from a bracket 251 on the carriage 160a. A beveled pinion 252 is secured to the outer face of the gear 250 to be driven by a beveled pinion 253 fast on a shaft 254. As shown in Figs. 3 and 21, the latter shaft has bearings in a bracket 255 projecting from the carriage 160a and a bracket 256 projecting from the end frame 157. A sprocket wheel 257 is secured to the shaft 254 to be driven by a chain 258 and, as shown in Figs. 3 and 7, the chain 258 is adapted to be driven by a sprocket wheel 259 fast on the shaft 85. As hereinbefore described, the shaft 85 projects from the rear housing 86 being driven by the motor 87 through suitable gearing in said housing.

When the edge printing and marking units are to be readjusted to mark lumber of a different length from that previously marked, the motor 87 is operated under control of the switch 88 so that the shaft 254 is rotated and the chain 246 is driven through the connecting gearing. The chain 246 has the sprocket wheels 245 for the several units 20, 21a, 22 and 21 in engagement therewith so that several shafts 236 of said units are driven in timed relation to each other. Through the differential gearing comprising the gears 237, 238, 239, 240, 241, 242, 243 and 244 the several shafts 234 are rotated at different rates of speed and the several carriages for the units 20, 21a, 22 and 21 are traversed at the corresponding speeds through the traction sprockets 235 engaging the chain 230. During this traversing movement the cams 175 and 227 (for actuating the printing and marking jaws) slide longitudinally of the shaft 59, said shaft being formed with a longitudinal keyway in which keys for turning the cams are slidable. The differential gearing is designed so that the unit 22 is always located midway between the units 19 and 20, the unit 21 is approximately midway between the units 20 and 22, and the unit 21a is approximately midway between the units 19 and 22, as indicated in Fig. 19.

Mechanism for adjusting for the width of lumber

The edge printing and marking mechanism is adjustable to receive boards or framing lumber of widely different widths, the adjusting mechanism being shown in Figs. 3, 5, 6, 21, 24 and 25. Extending longitudinally between the end frames 156 and 157 and journaled therein are shafts 260 and 261. Pinions 262, one for each of the units 19, 20, 21, 21a and 22, are keyed to the shaft 260 to engage toothed racks 263 severally mounted on the frames 164 and 218. As best shown in Figs. 24 and 25, toothed racks 264 are formed on each of the frames 218 (in parallel relation to the racks 263) and dogs 265 are pivoted on horizontal shafts 266 to engage the racks 264. Two of the racks 264 with the associated dogs 265 are provided for each of the large units 21 and 21a, as shown in Fig. 25, and each of the units 19, 20, and 22 has a single rack and dog of similar construction.

To severally actuate the dogs 265, cranks 267 are keyed to the shaft 261 and connected respectively to the dogs 265 by links 268. The shaft 261 projects from the outer face of the frame 157 and has a foot lever 269 secured to the projecting end. A weight 270 is placed on the lever 269 to normally retain the dogs 265 in engagement with the teeth of the racks 264, said lever having a projecting pedal 271 to be depressed for withdrawing the dogs 265 from engagement with the racks.

As shown in Figs. 3 and 21, a sprocket wheel 272 is fixed on a projecting end of the shaft 260 to be driven by a sprocket chain 273 which is trained on a sprocket wheel 274 mounted on a horizontal shaft 275. This shaft has suitable bearings secured to the top of the I-beam 159 and is arranged to be actuated by a hand wheel 276.

To adjust the spacing of the marking and printing jaws, the pedal 271 may be depressed to withdraw the dogs 265 from the toothed racks 264 and then the hand wheel 276 is rotated to turn the shaft 260 carrying the pinions 262 in the appropriate direction. These pinions actuate the racks 263 to positively raise or lower the frames 164 and 218 carrying the jaws 28. When said jaws have been moved to the desired position, the pedal 271 is released and the weight 270 actuates the shaft 261 to engage the dogs 265 in the racks 264.

Lumber guides and ejector

Mounted on the channel beams 8 at the delivery end of the lumber conveyer is a series of brackets 277 (Figs. 5 and 24) having fingers 278 projecting obliquely downward to bridge the gap between the ends of the conveyer and edge marking units. These fingers direct the lumber downward over the inclined upper surfaces of the edge marking units and each piece of lumber, as it approaches the marking jaws, is retarded by a series of spring fingers 279 projecting from the lower surface of the guide arms 26. These arms are rigidly secured to the bottom surface of the I-beam 159 at suitable spaced intervals and the lower surface of each arm has a recess 281 therein to permit the removal of the lumber from the marking jaws. As shown in Figs. 5, 14 and 15, the lumber is further guided to its position between the dies 29 and jaws 28 by guide plates 282 mounted on the jaws 28 for the end units 19 and 20.

As shown in Figs. 19, 24, 25 and 30, a pair of ejector arms 30 is provided for each of the units 21 and 21a. These arms have upper end surfaces 283 which are arranged to stop the lumber as it approaches the opening between the jaws. Each pair of arms 30 is pivoted on a shaft 284 and each of said arms is formed with a pair of ears 285 carrying a roller 286 to be actuated by a cam 287 (Figs. 25 and 30). The pair of cams 287 for each unit 21 and 21a are fixed on a shaft 288 arranged to be driven by a gear 289 secured to said shaft. Meshing with the gear 289 is a gear 290 slidably keyed to the main drive shaft 39.

To further insure proper positioning of each piece of lumber between the marking jaws before the latter are closed, we provide a series of arms 27 shown in Figs. 6 and 21. These arms are fixed at suitable spaced intervals on a horizontal shaft 292 supported in bearings 293 mounted on the I-beam 159. Padded shoes 294 on the lower ends of the arms 27 press the lumber between the jaws under the action of coiled springs 295, said springs being secured at their upper ends to brackets 296 projecting from the I-beam 159. As best shown in Figs. 3 and 21, fixed on a projecting end of the shaft 292 is a lever 297 adapted to be actuated by a lever 298 mounted on a pivot shaft 299. The ends of the lever 298 are provided with rollers, one to engage the lever 297 and the other to be actuated by a cam 300 fixed on the drive shaft 39.

As the shaft 39 rotates, the cam 300 imparts oscillating movement to the lever 298 which actuates the lever 297 and shaft 292 carrying the arms 27 so that said arms are alternately raised out of engagement with the lumber 10 by the action of the cam and then thrust against the lumber by the springs 295. On completion of the edge printing and marking, the cross heads carrying the dies 29 are raised to release the lumber and then the arms 30 are actuated by the cams 287 to raise the lumber free of the jaws 28 so that the lumber finally slides down the arms 30 out of the machine.

To collect sawdust and the end trimmings from the lumber, a hopper 301 is disposed longitudinally of the lumber beneath the saws and in the bottom of the hopper a belt conveyer 302 is arranged to collect the refuse, said conveyer being driven by an electric motor 303, through suitable speed reducing gearing shown in Fig. 3.

Having described our invention, what we claim as new and desire to protect by Letters Patent is:

1. In a lumber marking machine means for impressing a scale, consisting of major and minor subdivisions, extending from end to end of each piece of lumber, comprising a series of thin, rotary marking elements spaced apart longitudinally of the lumber, each of said elements having a toothed periphery adapted to penetrate the surface of the lumber, means associated with said elements to limit said penetration, said elements being divided into a plurality of groups and resilient means associated with each group independent of the other groups, for urging said marking elements toward the lumber.

2. A lumber trimming machine having in combination a conveyer for feeding pieces of lumber in a direction transversely of the greatest dimension thereof, saws disposed at opposite sides of said conveyer to trim the ends of lumber on said conveyer, a guide for one of said saws extending transversely of said conveyer, a carriage movable longitudinally of said guide, means for securing one of said saws on said carriage, said conveyer having elements in the path of movement of said saw longitudinally of said guide, means for actuating said saw transversely of said guide to clear said conveyer elements and means for actuating said carriage along said guide.

3. A lumber trimming machine having in combination a series of lumber skids, a conveyer for feeding pieces of lumber in a direction transversely of the greatest dimension thereof along said skids, saws disposed at opposite sides of said conveyer to trim the ends of lumber on said skids, said saws normally projecting downward below the top of said skids, a guide for one of said saws extending transversely of said conveyer and skids above the same, a carriage movable longitudinally of said guide, means for supporting one of said saws on said carriage, means for actuating said carriage along said guide and means for raising said supporting means and the saw carried thereby to pass said skids when said carriage is moved along said guide.

4. A lumber trimming machine having in combination a series of lumber skids, a conveyer for feeding pieces of lumber in a direction transversely of the greatest dimension thereof along said skids, a saw mounted in fixed position at one side of said conveyer to trim lumber on said skids, a guide for a second saw extending transversely of said conveyer and skids above the same, a carriage movable longitudinally of said guide, a second saw supported on said carriage, both of said saws normally projecting downward below the top of said skids, means for actuating said carriage along said guide, means for raising said second saw on said carriage to pass said skids when said carriage is moved along said guide, means for locking said carriage in predetermined positions to trim lumber of various lengths and means for actuating said conveyer to feed lumber to said saws.

5. A lumber trimming machine having in combination a lumber conveyer for feeding pieces of lumber in a direction transversely of the greatest dimension thereof, saws disposed at opposite sides of said conveyer to trim the ends of the lumber conveyed thereby, a guide for one of said saws extending transversely of said conveyer, a carriage movable longitudinally of said guide, a saw cradle on said carriage, means for securing one of said saws on said cradle, said conveyer normally extending in the path of movement of said saw longitudinally of said guide, means for traversing said carriage along said guide and means for actuating said cradle and saw to clear said conveyer when said carriage is traversed.

6. In a lumber marking machine, a plurality of marking units mounted side by side to simultaneously receive a piece of lumber, each of said units having a movable jaw and a die associated therewith to mark the lumber and said units having plane top surfaces and recesses therein adjacent to said dies to receive the lumber, means for feeding lumber across said surfaces to said recesses and means for actuating said jaws to make a series of impressions spaced apart longitudinally of the lumber.

7. In a lumber marking machine, a plurality of marking units mounted side by side to simultaneously mark a piece of lumber, each of said units having a movable jaw and a die associated therewith to mark the edges of lumber and said units having inclined top surfaces and recesses therein adjacent to said dies to receive the lumber, means for guiding lumber edgeways across said surfaces to said recesses and means for actuating said jaws to make a series of impressions spaced apart longitudinally of the lumber in said recesses.

8. In a lumber marking machine, means for feeding lumber edgewise along a determined path, a series of marking units each having a pair of jaws to receive the lumber, said units being spaced apart longitudinally of the lumber and at right angles to the direction of the movement of the lumber along said path, the jaws of said units having openings between them to simultaneously receive a piece of lumber, means for actuating said jaws simultaneously to form a series of impressions spaced apart on a longitudinal surface of each piece of lumber and means for ejecting the lumber from said jaws.

9. In a lumber marking machine, a series of marking units mounted side by side to simultaneously mark a piece of lumber, each of said units having a movable jaw and a die associated therewith to mark the lumber, means for simultaneously actuating said jaws to make a series of impressions spaced apart longitudinally of the lumber, a guide for movement of certain of said units in a direction longitudinal of the lumber and means for actuating said units along said guide to adjust the machine for marking lumber of different lengths.

10. In a lumber marking machine, a series of marking units mounted side by side to simultaneously mark a piece of lumber, said units having aligned recesses therein to receive the lumber, means for feeding lumber to said recesses, a guide for movement of said units longitudinally of the lumber, means for actuating said units along said guide to compensate for lumber of various lengths and means for actuating said units to make a series of impressions on longitudinal surfaces of the lumber.

11. In a lumber marking machine, means for feeding lumber edgewise along a determined path, a guide for a series of marking units extending across said path, marking units movable along said guides and each having a pair of jaws, said units being spaced apart longitudinally of said guides and the jaws of said units having openings between them to simultaneously receive a piece of lumber, means for actuating said units along said guide to compensate for lumber of various lengths, means for actuating one of the jaws of each pair to form a series of impressions on a longitudinal surface of each piece of lumber, means for actuating the other jaw of each pair to compensate for lumber of various widths and means for ejecting the lumber from said jaws.

12. In a lumber marking machine, means for feeding lumber edgewise along a determined path, a guide for a movable marking unit extending across said path, a marking unit movable along said guide and having a pair of jaws, means for actuating said unit along said guide, means for actuating one of said jaws to form an impression on a longitudinal surface of lumber and means for actuating the other jaw to compensate for lumber of various widths.

13. A lumber marking machine having in combination, a guide for a series of marking units, marking units disposed side by side and severally movable along said guide, means having differential gearing for simultaneously moving said units at different rates of speed along said guide and means for actuating said units to make a series of impressions spaced longitudinally of the lumber.

14. A lumber marking machine having in combination, a guide for a series of marking units, marking units for the lumber severally movable along said guide, a power-driven element for actuating each of said units along said guide and differential connections between said power-driving elements and units respectively for actuating said units at different rates of speed along said guide.

15. A lumber trimming and marking machine having in combination, means for feeding lumber transversely of its greatest dimension along a determined path, a guide for a marking device extending longitudinally of the lumber on said feeding means, a marking device movably secured to said guide, an indicating device connected to said marking device for movement in unison therewith, said indicating device being visible from the station of an operator at a side of said path to indicate the position of said marking device on said guide and means for moving said marking device along said guide to adjust the machine to receive lumber of various lengths.

16. A lumber trimming and marking machine having in combination, means for feeding lumber transversely of its greatest dimension along a determined path, guides for trimming and marking devices extending across said feeding means, a set of trimming and marking devices at one side of said path, carriages movable along said guides respectively, a second set of trimming and marking devices mounted on said carriages, means connecting said carriages for conjoint movement, and means for actuating said carriages along said guides to adjust the machine to receive lumber of various lengths.

17. In combination, a conveyer table, means for advancing boards edgewise thereover, a saw disposed to trim the ends of boards thus advanced, printing mechanism disposed to engage the trimmed ends of such boards, means to adjust the saw transversely of the direction of movement of the boards, and means connecting the saw and printing mechanism for conjoint adjustment.

18. In combination, a conveyer for advancing lumber transversely of its greatest dimension, trimming mechanism fixed at one side of said conveyer to trim the ends of lumber advanced thereby, a guide for a second trimming mechanism extending transversely of said conveyer, a second trimming mechanism movable along said guide and arranged to trim the ends of lumber remote from said first trimming mechanism, a marking device disposed to engage the ends of lumber trimmed by said first trimming mechanism, a guide for a second marking device extending parallel to said first mentioned guide, a second marking device movable along said second guide to engage the ends of lumber trimmed by said second trimming mechanism and means for conjointly actuating said second trimming mechanism and second marking device longitudinally of said guides to adjust the machine to receive lumber of various lengths.

19. In combination, a conveyer for advancing lumber transversely of its greatest dimension, a marking device fixed at one side of said conveyer to engage the ends of lumber so advanced, a guide for a second marking device extending transversely of said conveyer, a second marking device movable along said guide and arranged to engage the ends of lumber remote from said first marking device, and means for actuating said second marking device longitudinally of said guide to adjust said device to mark lumber of various lengths 20. A lumber marking and trimming machine having in combination, means for conveying lumber in a direction transversely of its greatest dimension along a determined path, a saw disposed to trim the ends of lumber thus advanced, a multiplicity of regularly spaced markers arranged to engage and form parallel lines on surfaces of the lumber moving along said path, said lines constituting continuous scales extending from end to end of the lumber, means for traversing said saw transversely of the direction of movement of the lumber and means for locking said saw in alignment with certain of said markers for trimming the lumber to exact lengths corresponding to integral multiples of the space between adjacent markers.

HENRY H. PAYZANT.
PAUL F. LUETH.